(No Model.)
E. S. BOND.
WIRE NETTING MACHINE.
No. 478,561. Patented July 12, 1892.
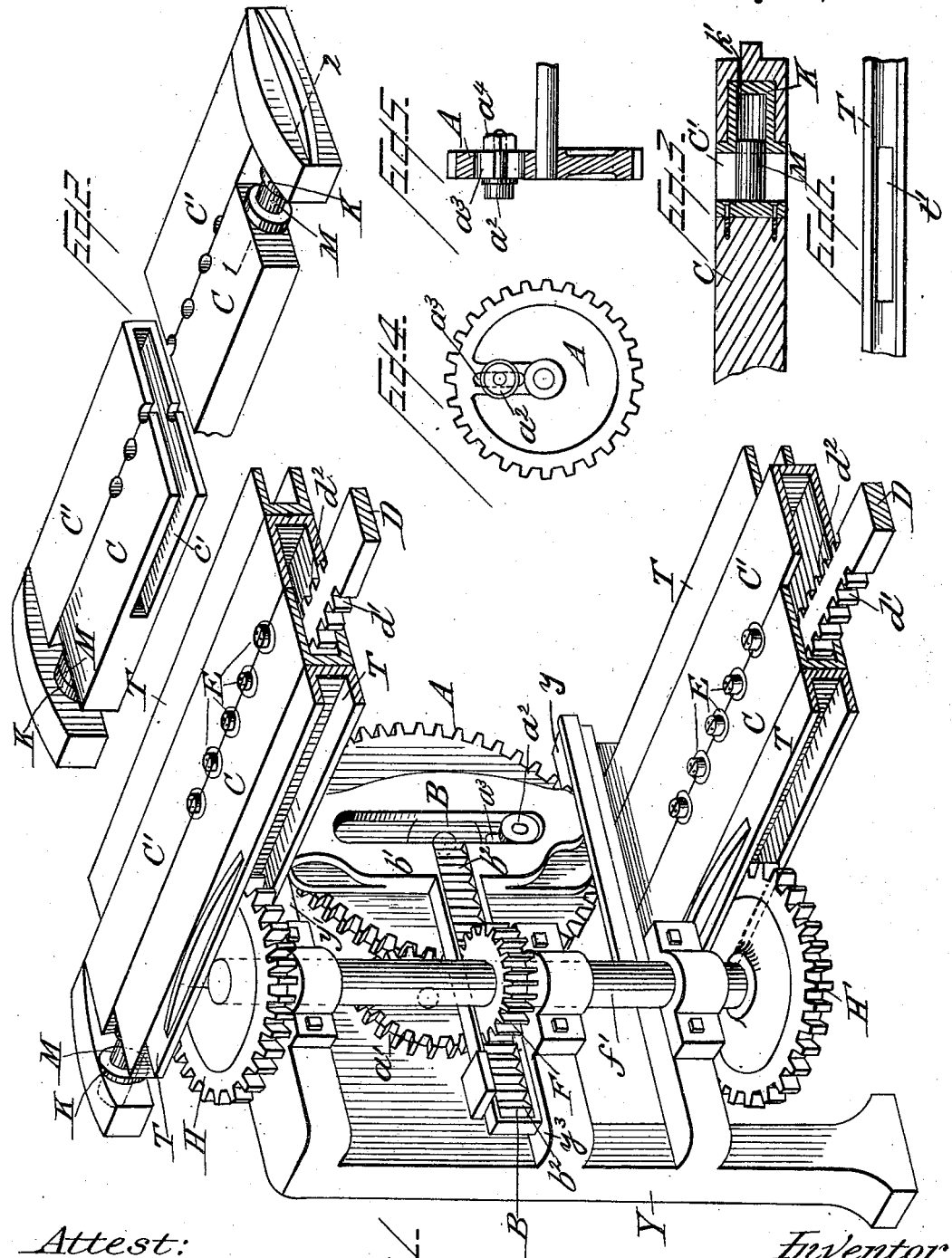
Attest:
F. H. Schott
W. H. Muzzy
Inventor
Edward S. Bond
by Wm H Babcock
Atty

UNITED STATES PATENT OFFICE.

EDWARD SAMUEL BOND, OF BIRMINGHAM, ENGLAND.

WIRE-NETTING MACHINE.

SPECIFICATION forming part of Letters Patent No. 478,561, dated July 12, 1892.

Application filed July 10, 1891. Serial No. 399,027. (No model.) Patented in England October 8, 1890, No. 15,943.

*To all whom it may concern:*

Be it known that I, EDWARD SAMUEL BOND, engineer and machinist, and a subject of the Queen of Great Britain, residing at Crown Engine Works, Lower Hurst Street, East Birmingham, in the county of Warwick, England, have invented certain new and useful Improvements in Machinery for Manufacturing Wire-Netting, (which I have patented in England, No. 15,943, dated October 8, 1890,) of which the following is a specification.

My invention has for its object improvements in machinery for manufacturing wire-netting, and relates more particularly to the means for operating the racks and pinions for twisting the wire, being a further improvement on my previous patent, No. 432,223, dated July 15, 1890, and by which I operate the said racks in a much more direct manner, which is of great importance when manufacturing wire-netting of strong gage, as the vibration is considerably reduced.

Another portion of my invention has for its object the reduction in vibration and noise caused by the necessary sudden stop and reversing of the plates or beams in their travel.

In carrying my invention into effect the disk for operating the racks backward and forward is mounted upon suitable brackets upon and parallel with one end of the machine, and this disk is operated from the main shaft by a pinion or spur-wheel. Upon this disk, and so as to form a crank, a roller is mounted, which roller works in a vertical slot or groove in a sliding bracket, so that as the disk revolves the bracket is moved horizontally backward and forward. Upon this bracket another rack is formed, which toothed rack engages with a toothed spur upon a vertical shaft, which shaft has a toothed wheel or segment both at the top and bottom engaging with teeth formed on the outside of the main racks of the machine, a slot being formed in the side of the stretchers and plates or beams to allow of the toothed wheel engaging with the teeth in the rack. The travel of the racks is adjusted by means of the adjustable roller on the disk, the throw of which is increased or decreased, as may be desired, by moving the arbor of the said roller in the radial slot $a^3$ of the said disk. The said arbor is screw-threaded at its outer end, making it a bolt provided with a nut $a^4$, which is loosened to allow such motion and tightened again when the adjustment has thus been effected. The operation is then as follows: The revolving of the disk operates the toothed rack on the brackets, which in turn actuates the spur upon the vertical shaft, thus turning the toothed wheels or segments backward or forward, and as these engage in teeth formed in the racks the racks receive a similar backward or forward movement from the main shaft in a most direct manner for turning the pinions for twisting the wire.

The other portion of my invention refers to the mode of stopping and reversing the travel of the plates without vibration, and this I effect by forming a hollow cylinder or other cavity at each end of one of each pair of plates or beams and a piston or projection at each end of the other plate, the said pistons or projections on one plate working in the cylinders or cavities on the other plate with an intermediate cushion of air, gas, water, or steam, thereby forming a stop between the two plates, which considerably reduces the vibration and noise and stops the plates dead in the position for the turning of the pinions, which thus locks them together. A small relief-aperture may be provided from the cylinder or cavity to relieve the extreme pressure of the pneumatic or other cushion.

In order that my invention may be clearly understood and more easily carried into practice, I have appended hereunto one sheet of drawings, upon which I have fully illustrated the nature of my said improvements.

Figure 1 is a perspective view of one end of my machine, showing the mode of operating the racks. Fig. 2 is a perspective view of the plates C, showing the arrangement for saving the concussion or shock caused by the reversing of the plates. Fig. 3 is a section through Fig. 2 on the line 1 2. Figs. 4 and 5 represent, respectively, a side elevation and a vertical sectional view of the operating-disk; and Fig. 6 represents a fragmentary detail view of the stretcher T, showing the slot through which the gear-wheel turns.

The operation of the plates C and C' and the general operation of the machine is similar to that shown in my former patent before referred to.

The first part of my present improvement consists of the operation of the racks D, of which I now use but one in each pair of plates C for the operation of the pinions E. The reciprocating motion of these racks is effected by means of the toothed disk A, which is mounted on the frame Y at one end of the machine, this disk A being operated from the main driving-shaft by the spur $a'$. The roller or stud $a^2$ is mounted on the disk A and works in the vertical slot or groove $b'$, formed in the sliding cross-head or bracket B, so that as the disk A revolves the bracket is moved backward and forward in a horizontal direction in the slides $y'$, $y^2$, and $y^3$, which are formed on the frame Y. Upon this bracket B the toothed rack $b^2$ is formed, which rack $b^2$ engages with and operates the spur F upon the vertical shaft $f'$, which also has upon it at the top and bottom the toothed wheels or segments H and H', which engage with the teeth $d'$, formed on the outside of the main racks D of the machine, and thus operating them backward and forward, these racks D being provided with teeth $d^2$ on the inside, which rotate the twisting pinions E. Apertures $t'$ and $c'$ are formed in the stretchers T and plates C to allow the toothed wheels H and H' to engage with the racks D for the operation of the pinions E for twisting the wire. The stud or roller $a^2$ is adjustably mounted in a radial slide formed on the disk A, so that the travel of the cross-head or bracket B may be adjusted to give the desired travel to the racks D.

I do not confine myself to the position shown for the piston M and cylinder K, as they may be placed at any convenient position with regard to the plates C and C' and may be attached to existing machines.

What I claim, then, is—

1. In machinery for manufacturing wire-netting, the pinions E for twisting the wire, in combination with the main racks D, engaging the said pinions, the gear-wheels H H', which engage and drive the said racks, a pinion on the shaft of said pair of gear-wheels, a rack $b^2$, engaging the said pinion and provided with a slotted part, a disk provided with an eccentric-stud which engages the said slot, and plates C C', containing the main racks and wire-twisting pinions, substantially as set forth.

2. In machinery for manufacturing wire-netting, the pinions E for twisting the wire, in combination with the main racks D, engaging the said pinions, the gear-wheels H H', which engage and drive the said racks, a pinion on the shaft of each pair of gear-wheels, a rack $b^2$, engaging the said pinion and provided with a slotted part, a rotary disk provided with a stud or roller which works in the slot of said part to reciprocate the said rack, the said disk having a radial slot formed in it and the said stud being adjustable therein, and the plates C C', containing the main racks and wire-twisting pinions, substantially as set forth.

3. In machinery for manufacturing wire-netting, reciprocating plates C and C', in combination with buffers arranged between their opposing parts, and consisting of plungers M, attached to one set of plates and cylinders K, attached to the other set thereof, the wire-twisting pinions and racks engaging said pinions within the said plates, and mechanism for reciprocating the said racks, for the purpose set forth.

In testimony that I claim the foregoing as my own I affix my name in the presence of two witnesses.

EDWARD SAMUEL BOND.

Witnesses:
LEWIS WM. GOOLD,
GEORGE PRICE.